United States Patent
Monnier et al.

(10) Patent No.: US 8,673,262 B2
(45) Date of Patent: Mar. 18, 2014

(54) PRODUCTION OF HYDROGEN FROM OXYGENATED HYDROCARBONS

(75) Inventors: Jacques Monnier, Ottawa (CA); Yi Zhang, Ottawa (CA); Andrew McFarlan, Stittsville (CA)

(73) Assignee: Her Majesty the Queen in right of Canada, as represented by the Minister of Natural Resources, Ottawa, Ontario (CA)

( * ) Notice: Subject to any disclaimer, the term of this patent is extended or adjusted under 35 U.S.C. 154(b) by 328 days.

(21) Appl. No.: 12/936,729

(22) PCT Filed: Apr. 23, 2009

(86) PCT No.: PCT/CA2009/000538
§ 371 (c)(1),
(2), (4) Date: Oct. 7, 2010

(87) PCT Pub. No.: WO2009/129622
PCT Pub. Date: Oct. 29, 2009

(65) Prior Publication Data
US 2011/0027169 A1    Feb. 3, 2011

(30) Foreign Application Priority Data
Apr. 23, 2008  (WO) ................ PCT/CA2008/000757

(51) Int. Cl.
*C01B 3/02*  (2006.01)

(52) U.S. Cl.
USPC ...................................................... 423/648.1

(58) Field of Classification Search
USPC ............... 423/650, 651–654, 648.1; 48/127.5
See application file for complete search history.

(56) References Cited

U.S. PATENT DOCUMENTS

| | | |
|---|---|---|
| 5,616,154 A | 4/1997 | Elliott et al. |
| 6,699,457 B2 | 3/2004 | Cortright et al. |
| 6,964,757 B2 | 11/2005 | Cortright et al. |
| 6,964,758 B2 | 11/2005 | Cortright et al. |
| 8,207,385 B2 * | 6/2012 | O'Connor et al. ............ 585/240 |
| 2003/0099593 A1 | 5/2003 | Cortright et al. |
| 2003/0220531 A1 | 11/2003 | Cortright et al. |
| 2004/0156777 A1 | 8/2004 | Reichman et al. |
| 2005/0207971 A1 | 9/2005 | Cortright et al. |

FOREIGN PATENT DOCUMENTS

| | | |
|---|---|---|
| CA | 787831 | 6/1968 |
| CA | 2613497 | 6/2006 |
| WO | WO 03/016211 A1 | 2/2003 |

OTHER PUBLICATIONS

Tanksale et al. "Reaction Mechanism for Renewable Hydrogen form Liquid Phase Reforming of Sugar Compounds", 2006, Dev. Chem. Eng. Mineral Process. 14(1/2) pp. 9-18.*

(Continued)

*Primary Examiner* — Wayne Langel
*Assistant Examiner* — Syed Iqbal

(57) ABSTRACT

The invention provides a process of producing hydrogen that involves aqueous phase reforming of an oxygenated hydrocarbon, preferably one obtained from a renewable source such as biomass. The reaction is carried out in the absence of electrolytes and in the presence of a dispersed particulate heterogeneous catalyst. The reaction is carried out under pressure and relatively low temperature in a stirred tank reactor, preferably a continuous stirred tank reactor.

15 Claims, 5 Drawing Sheets

(56) References Cited

OTHER PUBLICATIONS

Davda, R.R., Shabaker, J.W., Huber, G.W., Cortright, R.D. and Dumesic, J.A. "A review of catalytic issues and process conditions for renewable hydrogen and alkanes by aqueous-phase reforming of oxygenated hydrocarbons over supported metal catalysts" *Applied Catalysis B: Environmental* 56:1-2:171:186, 2005.

Cortright, R.D., Davda, R.R. and Dumesic, J.A. "Hydrogen from catalytic reforming of biomass-derived hydrocarbons in liquid water" *Nature* 418:6901:964:967, 2002.

Shabaker, J.W., Davda, R.R., Huber, G.W., Cortright, R.D. and Dumesic J.A. "Aqueous-phase reforming of methanol and ethylene glycol over alumina-supported platinum catalysts" *Journal of Catalysis* 215:2:344:352, 2003.

Shabaker, J.W., Huber, G.W., Davda, R.R., Cortright, R.D. and Dumesic, J.A. "Aqueous-phase reforming of ethylene glycol over supported platinum catalysts" *Catalysis Letters* 88:1-2:1:8, 2003.

Shabaker, J.W., Huber, G.W. and Dumesic, J.A. "Aqueous-phase reforming of oxygenated hydrocarbons over Sn-modified Ni catalysts" *Journal of Catalysis* 222:1:180:191, 2004.

Shabaker, J.W., Simonetti, D.A., Cortright, R.D. and Dumesic, J.A. "Sn-modified Ni catalysts for aqueous-phase reforming: characterization and deactivation studies" *Journal of Catalysis* 231:1:67:76, 2005.

Monnier, J., Tourigny, G., Sulimma, H. and Pelletier, L. "Low temperature production of hydrogen from glycerol and sugars" *18th Canadian Symposium on Catalysis*, Montreal, Quebec, Canada, May 16-19, 2004.

Monnier, J., Tourigny, G., Sulimma, H. and Pelletier, L. "Evaluation of catalyst performance for low temperature production of hydrogen from glycerol and sugars" *19th North American Catalysis Society Meeting*, Philadelphia, Pennsylvania USA, May 22-27, 2005.

Miyao et al., "Liquid phase methanol reforming with water over silica supported Pt-Ru catalysts" *Catalysis Today*, 87:1:227:235, 2003.

Valenzuela, M.B., Jones, C.W, and Agrawal, P.K., "Batch Aqueous-Phase Reforming of Woody Biomass", *Energy Fuels*, 20:4:1744:1752, 2006.

Monnier, J., Tourigny, C. and Pelletier, L., "Production of Hydrogen from Glycerol and Sugars BIOCAP Conference Program" (p. 68), CANMET Energy Technology Centre http://www.biocap.ca/images/pdfs/biocap_conference_program.pdf.

Elliott, D.C., Sealock, L.J. Jr.; Butner, R.S., Baker, E.G., Neuenschwander, G.G., "Low-temperature conversion of high-moisture biomass: Continuous reactor system results", Pacific Northwest Lab., Richland, WA (USA) http://www.osti.gov/energycitations/product.biblio.jsp?osti_id=5657956&query_id+3.

"Integrated Reactor Design for Hydrogen Production from Biomass-Sourced Reactants Streams Using the Aqueous-Phase Carbohydrate Reforming (ACR) Process", Virent Energy Systems, May 4, 2005 http://www.osti.gov/bridge/servlets/purl/839466-IQI8cv/native/839466.pdf.

Cortright, Randy D., "Hydrogen Generation from Sugars via Aqueous-Phase Reforming", Virent Energy Systems, INC., WHEC 16 / Jun. 13-16, 2006, Lyon, France http://www.google.ca/search?hl=en&q=hydrogen+generation+from+sugars+via+aqueous&meta.

Conversion of Glycerol Stream in a Biodiesel Plant http://www.virent.com/whitepapers/Biodiesel%20Whitepaper.pdf.

"II.A.4. Production of Hydrogen by Biomass Reforming", FY 2006 Annual Progress Report, DOE Hydrogen Program http://www.hydrogen.energy.gov/pdfs/progress06/ii_a_4_wang.pdf.

Huber, G.W., Shabaker, J.W. and Dumesic, J.A., "Raney Ni-Sn CataLyst for $H_2$, Production from Biomass-Derived Hydrocarbons" *Science* 300:2075:2077 (2003) http://sps.nus.edu.sg/~shampadm/Files/Download/h2%20biomass.pdf.

Zhang, Y. and Monnier, J., "Low Temperature Hydrogen Production from Aqueous Phase Reforming of Glycerol", Technical Report CETC-O/BIOLAB Apr. 2006 (CF), CANMET Energy Technology Centre, Jul. 2006.

Davda, R.R., Shabaker, J.W., Huber, G.W., Cortright, R.D. and Dumesic, J.A., "Aqueous-phase reforming of ethylene glycol on silica-supported metal catalysts" *Applied Catalysis B: Environmental* 43:13:26, 2003.

Alcalá, R., Mavrikakis, M. and Dumesic, J.A., "DFT studies for cleavage of C-C and C-O bonds in surface species derived from ethanol on Pt(111)", *Journal of Catalysis* 218:178:190, 2003.

Dumesic, J.A., Davda, R.R., Huber, G.W., Shabaker, J.W. and Cortright, R.D., "Catalytic production of renewable fuels by aqueous-phase reforming of biomass-derived oxygenated hydrocarbons", *13th International Congress on Catalysis*, Jul. 11-16, 2004, O4-006 (2004).

Huber, G.W., and Dumesic, J.A. "An overview of aqueous-phase catalytic processes for production of hydrogen and alkanes in a biorefinery" *Catalysis Today* 111:1-2:119:132, 2006.

Huber, G.W., Shabaker, J.W., Evans, S.T. and Dumesic, J.A. "Aqueous-phase reforming of ethylene glycol over supported Pt and Pd bimetallic catalysts" *Applied Catalysis B: Environmental* 62:3-4:226:235, 2006.

Shabaker, J.W., and Dumesic, J.A. "Kinetics of aqueous-phase reforming of oxygenated hydrocarbons: $Pt/Al_2O_3$ and Sn-modified Ni catalysts" *Industrial & Engineering Chemistry Research* 43:12:3105-3112, 2004.

Guo, J. and Al-Dajjan, M. "Activity and stability of iron-containing pillared clay catalysts for wet air oxidation of phenol" *Applied Catalysis A: General* 299:175:184, 2006.

Pitault, I., Fongarland, P., Mitrovic, M., Ronze, D. and Forissier, M. "Choice of laboratory scale reactors for HDT kinetic studies or catalyst tests" *Catalysis Today* 98:31:42, 2004.

Davda, R.R., and Dumesic, J.A. "Catalytic reforming of oxygenated hydrocarbons for hydrogen with low levels of carbon monoxide" *Angewandte Chemie—International Edition* 42:34:4068:4071, 2003.

Cao, C. and Fung, S. "Comparison of heterogeneous catalyst activities in various reactor types and reaction conditions" *Chemical Engineering Technology* 29:3:307:312, 2006.

Glycerol as a Source for Fuels and Chemicals by Low-Temperature Catalytic Processing, Ricardo R. Soares, Dante A. Simonetti, James A. Dumesic, Prof. http://www3.interscience.wiley.com/cgi-bin/abstract/112608174/ABSTRACT?CRETRY=1&SRETRY=0.

Tanksale, A. et al., "Reaction Mechanisms for Renewable Hydrogen from Liquid Phase Reforming of Sugar Compounds", *Developments in Chemical Engineering and Mineral Processing, Science and Technology Letters*, Northwood, GB, vol. 14, 2006, pp. 9-18.

Miyao, T. et al., "Catalytic activity of various supported Ir-Re catalysts for liquid phase methanol reforming with water", *Catalysis Communications, Elsevier Science*, Amsterdam, NL, vol. 6, No. 2, 2005, pp. 113-117.

Naito, Shuichi, "Marked Effect of Various Supports and Additives Upon Liquid Phase Methanol Reforming with Water over Supported Group 8-10 Metal Catalysts", *Catalysis Surveys from Asia, Kluwer Academic Publishers, DO*, vol. 9, No. 4, 2005, pp. 243-258.

\* cited by examiner

PRODUCTION OF HYDROGEN FROM OXYGENATED HYDROCARBONS

This application is a national phase filing of International Application No. PCT/CA2009/000538, filed Apr. 23, 2009 and published in English on Oct. 29, 2009, as WO 2009/129622, which claims priority to International Application No. PCT/CA2008/000757, filed Apr. 23, 2008. The disclosures of International Application No. PCT/CA2009/000538 and International Application No. PCT/CA2008/000757 are each incorporated herein by reference in the entirety for all purposes.

TECHNICAL FIELD

This invention relates to the production of hydrogen from oxygenated hydrocarbons, preferably those derived from biomass. More particularly, the invention relates to the production of hydrogen from oxygenated hydrocarbons by aqueous phase reforming procedures.

BACKGROUND ART

Hydrogen fuel cells have emerged as promising devices for clean and efficient generation of power for global energy needs. Although hydrogen fuel cells have a low impact on the environment, current hydrogen production technologies rely on high-temperature steam reforming of non-renewable hydrocarbon feedstocks. Greater environmental benefits of generating power from hydrogen fuel cells could be achieved if hydrogen could be produced from renewable resources, such as biomass. However, current technologies for generating hydrogen from biomass, such as enzymatic decomposition of sugars, steam reforming of bio-oils, and gasification of biomass, all suffer from low hydrogen production rates and poor economics.

Recently, Dumesic et al. (References 1, 2, 3, 4, 5, 6, 7, 8, 9 and 10—see References section at the end of this description) have reported that hydrogen can be produced at relatively low temperatures, e.g. around 277° C., over supported metal catalysts by a single step aqueous-phase reforming of biomass-derived oxygenated hydrocarbons, such as methanol, ethylene glycol, glycerol, sorbitol, xylose and glucose. In addition to utilizing renewable feedstocks, aqueous phase reforming of oxygenated hydrocarbons eliminates the need to vaporize water and the oxygenated hydrocarbon (which reduces the energy requirements and $CO_2$ generation for producing hydrogen). Generating 1 ton of hydrogen (11,120 $m^3$ at STP) from glycerol (derived from biomass) displaces 5.5 tons of $CO_2$ from fossil origin (when employing steam methane reforming) (see References 11 and 12). In addition, the low reaction temperature and the absence of water vaporization eliminate 0.6 ton of $CO_2$/ton $H_2$ produced (References 11 and 12). The production of $H_2$ and $CO_2$ by aqueous phase reforming also leads to the production of low levels of CO (<1000 ppm) in a single catalytic process.

Nevertheless, important selectivity challenges govern hydrogen production by aqueous phase reforming because the mixture of $H_2$ and $CO_2$ formed in this process is thermodynamically unstable at low temperatures with respect to formation of methane (Reference 1). Accordingly, the selective formation of hydrogen represents a classic problem in heterogeneous catalysis and reaction engineering: namely the identification of a catalyst and the design of equipment and conditions to maximize the yields of desired products at the expense of undesired byproducts formed in series and/or in parallel reaction pathways. Several types of catalysts, including supported metal and Sn-modified Raney Ni catalysts, have been tested for aqueous phase reforming in order to identify the effect of different catalytically active metals, metal alloy components and supports on $H_2$ selectivity (Reference 1). Among them, the Pt/γ-$Al_2O_3$ and Sn-modified Raney Ni catalysts were the most promising (References 1, 2, 3, 5, 6, 7, 8, 9 and 10). The 3 wt % Pt/γ-$Al_2O_3$ catalysts were found to have the best hydrogen selectivity, yield and production rate (References 11 and 12).

However, little work has been done on reactor configuration to maximize hydrogen selectivity, yield and production rate. In the current aqueous phase reforming development, only fixed-bed tubular reactors have been used for activity testing (References 1, 2, 3, 4, 5, 6, 7, 8, 9, 10, 11 and 12). Nevertheless, aqueous phase reforming involves multiple phases: reactants in the liquid phase, catalysts in the solid phase, and the desired hydrogen product in the gas phase. Therefore, the interphase and intraparticle mass transfer is one of the critical issues that need to be addressed for measuring and optimizing catalyst activity. To measure the catalyst intrinsic activity, very fine particles between 63-125 μm were tested in fixed bed tubular reactors by Dumesic et al. (References 3 and 6). For example, for the kinetic study of aqueous phase reforming of ethylene glycol over an alumina-supported platinum catalyst, a maximum particle size of 130 μm was used to ensure that the intraparticle and interphase mass transfers were not limiting (Reference 6).

In theory, such fine particles are not recommended in fixed bed tubular reactors because of the resulting high pressure drop along the catalyst bed in reaction conditions. Also it is easy for small particles to be washed out by the liquid stream, which implies potential catalyst loss and undesirable secondary pollution to the liquid (Reference 13). Moreover, the use of fixed bed tubular reactors for liquid solid phase reaction has some other disadvantages, such as poor wetting of catalyst, although co-current upflow has been used to improve the wetting of catalyst (Reference 14).

Various patents and patent applications have been published in this field. Most notable are the patents and patent applications of Cortright and Dumesic, assigned to the University of Wisconsin-Madison, e.g. U.S. Pat. No. 6,699,457 issued on Mar. 2, 2004, U.S. Pat. No. 6,964,757 issued on Nov. 15, 2005, and U.S. Pat. No. 6,964,758 issued on Nov. 15, 2005, as well as published applications 2003/0220531 and 2005/0207971. These patents and applications describe the use of fixed bed tubular reactors (plug flow reactors) as exemplary systems. As noted above, such reactors are not ideal for hydrogen generation involving aqueous phase reforming.

A different approach has been taken by Patrick Grimes et al. in Canadian patent 787,831 of Jun. 18, 1968 and Canadian patent application Serial No. 2,613,497 filed Jun. 23, 2006. In these publications, an organic compound is reacted with water in a closed reactor in the presence of an electrolyte (preferably an alkaline compound such as KOH) and an electronically conductive catalyst. An electrical potential is applied between electrodes (or via an electrode) and gaseous hydrogen is produced (with carbon dioxide reacting to form a carbonate that remains in solution). It was stated that the conducting electrode may be replaced by suspending particles of any electronically conducting material in the liquid reactants, but the presence of the electronically conductive material is absolutely necessary because, without it, the reaction will not proceed or will proceed so slowly that it could not be of any possible commercial interest even at elevated temperatures. Thus, these procedures adopt an electro-chemical approach and require the presence of an electrolyte and a suspended electronically conductive material.

There is a need for improved processes and equipment for the aqueous phase reforming reaction used for the production of hydrogen from oxygenated hydrocarbons, particularly those obtained from biomass.

DISCLOSURE OF THE INVENTION

According to one exemplary embodiment of the invention, there is provided a process of producing hydrogen in which water is reacted with an oxygenated hydrocarbon in the condensed phase under pressure and low temperature in the presence of particles of supported metal catalyst dispersed in said condensed phase, wherein the reaction is carried out in a stirred tank reactor (e.g. a continuous stirred tank reactor or a semi-batch stirred reactor) in the absence of an electrolyte. The reaction relies on a heterogeneous catalytic reaction mechanism rather than electro-chemical reactions and, for this reason, no electrolyte is required in the condensed phase. The catalyst support is preferably porous and of high surface area.

Liquid reactants (water and oxygenated hydrocarbon) are fed into the reactor on a continuous or semi-batch basis. The vessel is normally closed so that it may be placed under moderately elevated pressure (e.g. 350 to 1350 psig, and more preferably about 900 psig), and has a heater to raise and maintain the temperature of the reactants to within a low temperature range, e.g. a temperature of 200 to 300° C. An even more preferred temperature range is 255 to 285° C.

The use of electrolytes in the reaction liquids is avoided because such materials may react with the intended products of the process, e.g. carbon dioxide to form carbonates. The reaction also proceeds adequately at initial pH values that are substantially neutral (e.g. pH 7±25%) when the oxygenated hydrocarbon starting material is initially dissolved in water, so strong acids and bases are avoided. During the reaction, the liquid phase may tend to acidify due to the presence of acid byproducts or intermediates.

Stirred tank reactors (particularly continuous stirred tank reactors) have high heat capacity, which makes for good temperature stability and good heat transfer. The catalyst and reactants have good contact since the system is well mixed (preferably homogeneously mixed) by the stirrer. Also, the catalyst particles may be made very small, with a minimum size limited by filtering, so that the largest possible solid/liquid interface is obtained, particularly when the catalyst support is porous and the metal catalyst is deposited within the pores.

The reaction may be carried out with various oxygenated hydrocarbons used as starting materials, e.g. as methanol, ethylene glycol, glycerol, sorbitol, xylose and glucose or other sugars, provided they are capable of undergoing an aqueous phase reformation resulting in the production of hydrogen. Glycerol is particularly preferred. It is also preferred from economic and environmental reasons that the oxygenated hydrocarbon material be obtained from biomass, and especially waste biomass, and the production of such oxygenated hydrocarbons from biomass may if desired be considered a preliminary step of the process of the invention.

Catalytic aqueous phase reforming has been found attractive because of significantly lower energy requirements due to low reaction temperatures compared with conventional steam methane reforming and the elimination of the need for reactant vaporization. It has also been found that the use of a stirred tank reactor (especially a continuous stirred tank reactor) gives a higher hydrogen selectivity and a better rate of conversion of the starting material than conventional fixed bed tubular (plug flow) reactors. Rapid separation of the gaseous products (hydrogen and carbon dioxide) from the condensed phase helps reduce reverse reaction or side reactions caused by the build up of reaction products.

It is most preferred for the reaction to use platinum and nickel catalysts supported on alumina, silica, activated carbon, zeolite or the like, having particle sizes in a range of 150-850 µm, although other supported metals such as palladium, ruthenium, rhodium and iridium may be employed. For the conversion of glycerol, a temperature of about 265° C. and a pressure of about 900 psig was found to be effective. Under these conditions, an undesirable formation of alkanes was impeded.

DEFINITIONS

The term "stirred tank reactor" means an agitated reactor vessel (preferably homogeneously stirred) using a mechanically-operating device such as an impeller, propeller, pump, magnetic stirrer, or the like, where the liquid reactants are converted to very high conversion levels in presence of catalyst in suspension.

The term "continuous stirred tank reactor" (CSTR) refers to any reactor vessel having contents that may be stirred and wherein material is continuously or continually added to the reactor and material is removed from the reactor at about the same rate as material is added thereto. The contents of the reactor are maintained by stirring in a generally homogeneous condition both from the composition and the temperature points of view. Gaseous products are continuously removed from the reactor as they are produced, optionally with the assistance of an unreactive gas introduced into the reactor and used to sweep the product gases from the headspace of the reactor. The solid catalyst in particulate form is normally introduced into the reactor before the reaction is started, but may be introduced in the stream of liquid starting materials. Solid catalyst escaping in the liquid stream removed from the reactor (if any) may be collected by means of a decanter and/or filter and may be recycled back to the reactor. The vessel is normally closed so that it may be placed under elevated pressure, and may have a heater of some kind to raise and maintain the temperature of the reactants to within the reaction range.

The term "semi-batch stirred tank reactor" refers to a reactor vessel where only gases are continuously fed and removed from it, but not liquids or solid catalyst particles. The semi-batch reactor can test the effect on product selectivity and yield, of separating gaseous products ($H_2$, $CO_2$, etc.) from the catalyst particles and the liquid phase as it is achieved in a CSTR.

The term "low temperature" as used herein means a temperature that is elevated above ambient temperature but low in comparison with temperatures currently required for the commercial production of hydrogen (typically 850° C. or higher). Temperatures in the range of 200 to 300° C. are often suitable, but higher or lower temperatures (e.g. by at least 10 or 15%) may be effective and desirable for particular starting materials and reaction conditions.

The term "electrolyte" as used herein refers to acids, bases and salts that are more or less dissociated in aqueous solution and whose ions act, to some extent, as free, independent entities or particles. The presence of such electrolytes is avoided in the process of the present invention.

The term "heterogeneous catalytic reaction mechanism" means a process of achieving or accelerating a chemical reaction by means of a solid catalyst having active sites at the surface where reactants are adsorbed and converted to adsorbed products which then desorb. Such a process requires neither the application of electrical potential, nor the transfer of electrical species.

BRIEF DESCRIPTION OF THE DRAWINGS

Exemplary embodiments of the invention are described in greater detail in the following in which reference is made to the accompanying drawings. In the drawings.

BEST MODES FOR CARRYING OUT THE INVENTION

Figure 1:
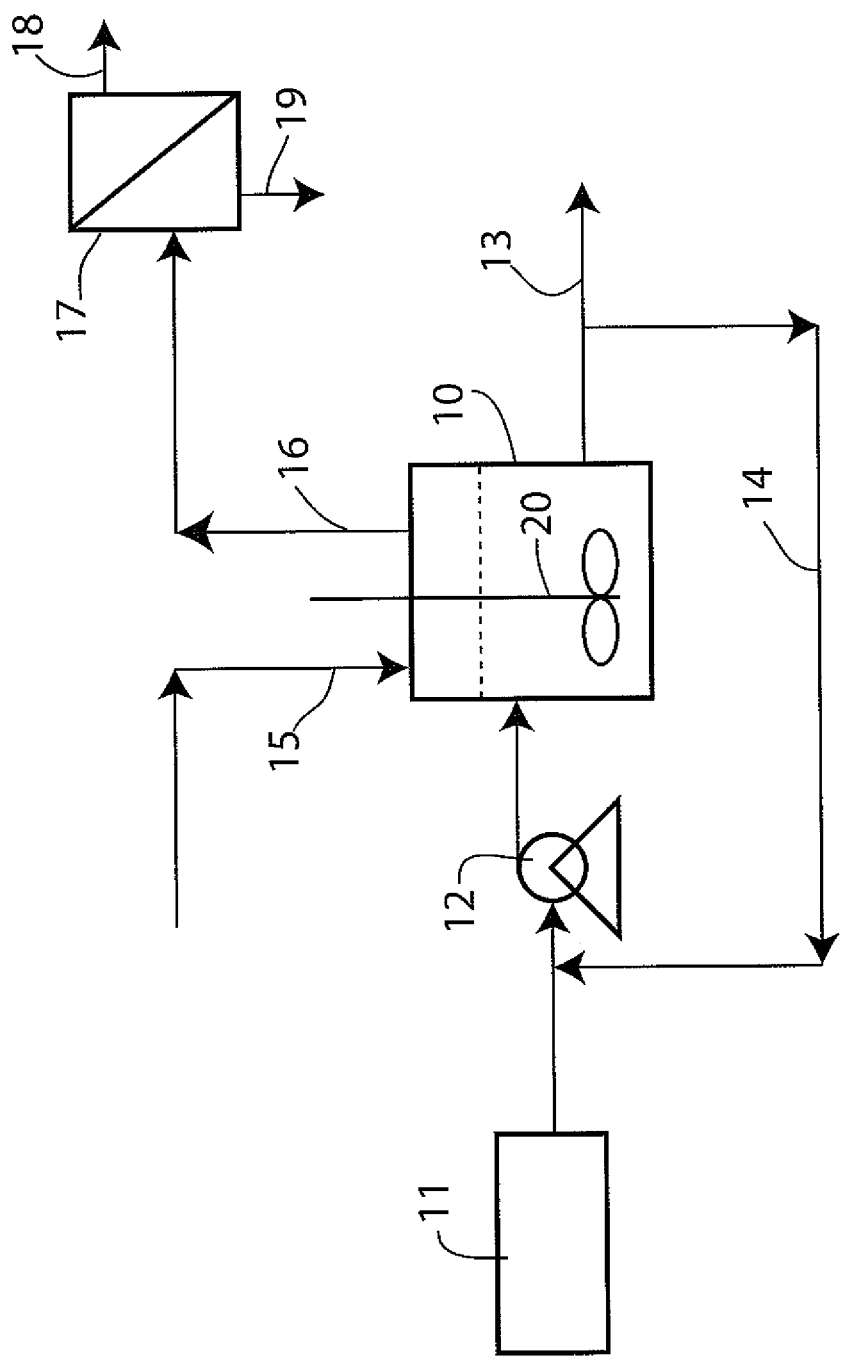
FIG. 1 is a flow diagram of a preferred process and apparatus for carrying out exemplary embodiments of the present invention.

Exemplary embodiments of the invention involve the production of hydrogen from any oxygenated at least partially water-soluble hydrocarbon starting material (e.g. glycerol, methanol, ethylene glycol, xylose, sorbitol and sugars) by aqueous phase reforming. In particular, $C_5$ and $C_6$ sugars, which can be derived from cellulose and hemicellulose, and glycerol (glycerin), which is a byproduct of biodiesel production (the transesterification of triglycerides), are especially preferred as starting materials as they are inexpensive and abundant. The production of hydrogen in this way involves reacting the oxygenated hydrocarbon with water at low temperatures and moderately elevated pressures using a suitable supported particulate catalyst dispersed in the aqueous reaction mixture. In exemplary embodiments, the reaction is carried out in the condensed phase (i.e. the water and oxygenated hydrocarbons are kept in the liquid phase) and the pressure is adjusted to ensure that this is the case. Higher pressures are generally not required but are not harmful. This means that if the temperature is increased, the pressure is increased accordingly to maintain the condensed phase. The actual temperatures employed may be relatively low (preferably 200 to 300° C., and more preferably 255 to 285° C.) and the pressures are adjusted accordingly and are generally in the range of 350 to 1350 psig, and more preferably about 900 psig (e.g. 900±175 psig). Of course, as noted above, the temperature and pressure combinations should be selected to ensure that the water and oxygenated hydrocarbons are maintained in the liquid phase.

The reaction is carried out in a stirred tank reactor (i.e. a semi-batch, or more preferably a continuous, stirred tank reactor) employing a suitable metal catalyst supported on a solid support (e.g. porous alumina) to form solid catalyst particles. The solid support used for dispersing the catalytic sites may be any (generally inert, high surface-area and normally porous) solid material commonly employed as a catalyst support, for example alumina, silica-alumina, silica, titania and various forms of carbon. The metallic sites may be supported on the solid support using conventional techniques to obtain a catalyst having well-dispersed active metal sites distributed over the catalyst surface in order to increase conversion and hydrogen selectivity. Suitable catalytic metals may be chosen from (for example) platinum, nickel, palladium, ruthenium, rhodium, iridium and tin-promoted nickel. Platinum and nickel are particularly preferred.

The catalyst particles are preferably made as small as possible without causing undue problems of catalyst loss and recovery. Smaller particles show better selection for hydrogen production and conversion of the starting material. A particularly preferred particle size range is 150-300 microns (especially 150-250 microns, or 250-300 microns), although particle sizes up to 850 microns or more still show good conversion and selectivity, and other preferred particle size ranges are 300-590 microns and 590 to 850 microns.

The stirring required in the continuous stirred tank reactor may be carried out in any suitable way and should be sufficient to keep the reaction mixture substantially homogenous and equal in temperature throughout the reactor. The amount of catalyst employed is generally the minimum amount required for the desired reaction and an amount that can be blended homogenously within the contents of the reactor.

The ratio of oxygenated hydrocarbon material to water used for the starting material is preferably one which permits the oxygenated hydrocarbon to dissolve in the water and preferably does not exceed 35 wt. %. In the case of glycerol as the oxygenated hydrocarbon, the ratio may be up to 35 wt. %, and is preferably in the range of 10 to 30 wt. %. In general, ratios of oxygenated hydrocarbon to water of 1 to 10 wt. % are normally suitable for any of the starting materials.

The reactants may be kept within the reactor for an average time effective to drive the reaction to completion. For example, weight hourly space velocities (the inverse of residence times) preferably range from 1 to 10 $h^{-1}$.

The reaction results in the production of hydrogen and carbon dioxide. An inert gas (preferably nitrogen) may be used to sweep the gaseous reaction products from the reactor, although this is by no means essential. The hydrogen can be separated from the carbon dioxide (and inert gas, if present) by any known means, e.g. membrane separation.

FIG. 1 is a flow diagram showing an example of the apparatus and process of the exemplary embodiments. The reaction is carried out in a continuous stirred tank reactor 10 acting as a pressure vessel or autoclave. A blend of oxygenated hydrocarbon in water 11 is fed continuously into the reactor at a suitable rate by a pump 12. Waste water containing organic byproducts is removed via conduit 13 and part of the waste may be recycled to the inlet feed via conduit 14. Nitrogen gas is optionally introduced into the reactor via conduit 15 and the product gas (containing mostly hydrogen and carbon dioxide, some light hydrocarbons and traces of CO, and optionally nitrogen) is removed via conduit 16 and subjected to gas separation in membrane separator 17, resulting in a hydrogen-rich stream withdrawn via conduit 18 and a $CO_2$-rich stream withdrawn via conduit 19. The reactor 10 contains a stirrer 20, e.g. an impeller, to keep the contents of the reactor in a suitable state of homogeneity. Not shown are heating means provided to raise the temperature of the contents of the reactor to the desired reaction temperature, but these may be conventional.

EXAMPLES

To illustrate the effectiveness of the process, glycerol was used as an exemplary oxygenated hydrocarbon starting material and tests were carried out as follows with a view to maximizing the hydrogen production rate and yield, and to compare the process with those using a fixed bed tubular reactor (operated at in a temperature range of 255 to 285° C., a pressure range of 770 to 1120 psi, a WHSV range of 0.1 to 1.1 $h^{-1}$, and feedstocks of 10, 20 and 30 wt. % glycerol). It should be kept in mind that the following details are merely exemplary and other starting materials and conditions may be employed successfully.

Reactions

According to Davda et al. (1), aqueous phase reforming of glycerol takes place according to the following stoichiometric reactions:

$$C_3H_8O_3 \Leftrightarrow 3CO+4H_2 \quad [1]$$

Water-gas shift reaction: $CO+H_2O \Leftrightarrow CO_2+H_2$ [2]

Overall reaction: $C_3H_8O_3+3H_2O \Leftrightarrow 3CO_2+7H_2$ [3]

Side methanation reaction: $CO+3H_2 \Leftrightarrow CH_4+H_2O$ [4]

Catalyst activity and selectivity are defined as:

Glycerol conversion to gaseous products (%)=[(total moles of C in gas products)/(total moles of C in the feed solution)]×100 [5]

$H_2$ selectivity (%)=[(moles of $H_2$ produced/moles of C in gas phase)×(7/3)]×100 [6]

Alkane selectivity (%)=[(moles of C in gaseous alkanes/total moles of C in gas products)]×100 [7]

Yield of $H_2$(L/100 g glycerol)=[(volume of $H_2$ produced)/(initial weight of glycerol)]×100 g glycerol [8]

Hydrogen production rate ($LH_2$/100 g cat/h)={[(volume of $H_2$ produced)/hour]/weight of catalyst}× 100 g catalyst [9]

To compare with the fixed bed tubular reactor, the integral activity and selectivity of the stirred tank reactor needs to be calculated because the fixed bed tubular reactor is an integrated reactor and it is impossible to measure gas and liquid concentrations along the catalyst bed (15). Therefore, only integral reaction rate and selectivity obtained in the stirred tank reactor can be used to compare with fixed bed tubular reactor (t is time-on-stream).

$$\text{Integral } H_2 \text{ production rate} = \int_0^t H_2 \text{ production rate}(t)dt/t \quad [10]$$

$$\text{Integral } H_2 \text{ selectivity} = \int_0^t H_2 \text{ selectivity}(t)dt/t \quad [11]$$

$$\text{Integral Alkane selectivity} = \int_0^t HC \text{ selectivity}(t)dt/t \quad [12]$$

$$\text{Integral } H_2 \text{ yield} = \int_0^t H_2 \text{ yield}(t)dt/t \quad [13]$$

According to Cao and Fung (16), weight hourly space velocity (WHSV) parameters are defined in Equations 14 and 15 for both fixed bed tubular reactor and stirred tank reactor. Catalyst activities in both reactors can be compared by plotting conversion as a function of WHSV. At the same conversion level, the difference in the WHSV values indicates different amounts of glycerol can be converted with the same weight of catalyst and the same contact time by different reactors.

WHSV of the fixed bed tubular reactor (based on $C_3H_8O_3$)=[feed rate of glycerol (weight/hour)]/ (weight of catalyst) [14]

WHSV of the stirred tank reactor (based on $C_3H_8O_3$)= (initial weight of glycerol in the reactor)/(time on stream)/(weight of catalyst) [15]

Residence time (fixed bed tubular reactor and semi-batch stirred tank reactor)=1/WHSV [16]

Catalyst Preparation

The inventors prepared 3 wt % Pt/γ-$Al_2O_3$ and 40 wt % Ni/γ-$Al_2O_3$ catalysts for testing in a semi-batch stirred tank reactor. The advantages of the use of a stirred tank reactor compared to a fixed bed reactor were demonstrated by comparing the performance of the two reactors in terms of hydrogen production rate, hydrogen selectivity, alkane selectivity and hydrogen yield.

High surface area γ-alumina (220 m²/g, pore volume 0.62 mL/g, medium pore diameter 7 nm, Alfa Aesar®) was used as catalyst support. The γ-alumina support was crushed and sieved to different mesh sizes in order to investigate the effect of catalyst particle size. Preliminary tests indicated that a broad mesh size significantly affected the experimental results. Table 1 summarizes different catalyst particle sizes.

TABLE 1

Summary of catalysts having different particle sizes

| Catalyst series | Mesh size | Particle diameter (μm) |
|---|---|---|
| Series I | 100-60 | 150-250 |
| Series II | 60-50 | 250-300 |
| Series III | 30-20 | 590-850 |

Gamma-alumina supported catalysts were prepared by incipient wetness impregnation (1.0 mL solution per gram of support) with the desired aqueous solution. For γ-alumina supported 3 wt % Pt catalysts, tetra-amine platinum nitrate ($Pt(NH_4)_4(NO_3)_2$, Alfa Aesar®) was used. After impregnation, samples were dried at 373° K (100° C.) overnight. Samples were subsequently heated to 673° K (400° C.) at 1° K/min in a mixture of 10% $O_2/N_2$ and held at 673° K (400° C.) for 2 hours.

For γ-alumina supported 40 wt % nickel catalysts, a two-step impregnation of nickel nitrate hexahydrate ($Ni(NO_3)_2 \cdot 6H_2O$, Fisher Chemical), was performed due to the high loading of Ni. The above drying and calcination procedures were performed between impregnation steps.

The catalysts were reduced in $H_2$ (GHSV=733 h$^{-1}$) in a tubular reactor prior to loading in the semi-batch stirred tank reactor. The catalyst bed was heated to 563° K (290° C.) for Pt catalyst or 723° K (450° C.) for Ni catalyst at 1° K/min and held for 2 hours. After reduction, the catalyst bed was cooled to room temperature while purging with $H_2$. Then, the reduced catalyst was transferred to the stirred tank reactor using a glycerol solution to protect the active sites from air oxidation.

Catalyst Testing

The stirred tank reactor used by the inventors for the aqueous phase reforming of glycerol was a laboratory scale apparatus and consisted of a 300 mL autoclave (Parr series 4560 Bench Top Mini reactor). After loading the desired amount of glycerol aqueous solution (approximately 100 mL of a 10 wt % glycerol aqueous solution) and a catalyst (about 1 to 4 g) in the reactor, the reactor was purged with $N_2$ then pressurized to the desired reaction pressure with $N_2$. Operating pressures and temperatures were 900 psig and 538° K (265° C.) or 548° K (275° C.), respectively. The stirring rate was set at 500 rpm to disperse the catalyst into the liquid phase, maximize mass transfer and ensure uniform temperature and concentration.

The product gas stream was carried by a nitrogen purge gas through a cold trap and was analyzed with an Hewlett-Packard 5890 Series II chromatograph acting as an on-line gas chromatograph. This gas chromatograph was configured with three detectors, i.e. two thermal conductivity detectors (TCD) and one FID. Hydrogen was analyzed on one thermal conductivity detector with $N_2$ as carrier gas. $CO_2$, $C_2$ hydrocarbons, $N_2$, $O_2$, $CH_4$ and CO were analyzed on the other thermal conductivity detector with He as a carrier gas. Also, $C_1$ to $C_6$ hydrocarbons were analyzed on the FID. Effluent gases were analyzed every 15 minutes. A vertical condenser was provided to avoid the passage of glycerol aqueous solution out of reactor by entrainment in the purge gas. The reactor gas outlet inner diameter was enlarged to ensure any entrained liquid flowed back to the reactor. The $N_2$ purge flow was high enough to ensure the line and sampling loop had the same gas concentration as the reactor gas flow.

Example 1

Performance of Pt Catalysts

To compare two types of catalytic reactors, the performance of glycerol aqueous phase reforming on 3 wt % Pt/γ-$Al_2O_3$ catalysts in both the semi-batch stirred tank reactor and a fixed bed tubular reactor is plotted in FIGS. 2a to 2d.

Figure 2A:
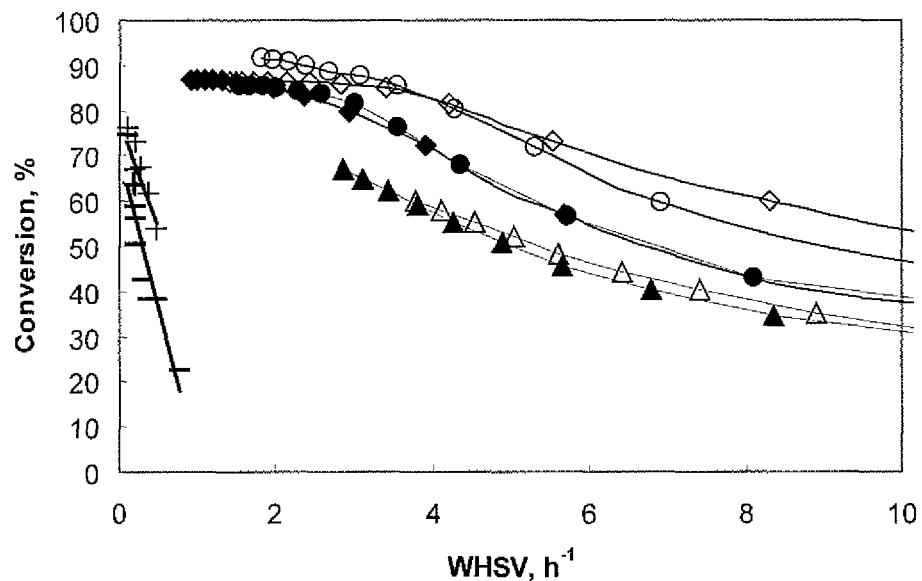
FIGS. 2a to 2d and FIGS. 3a to 3d are graphs showing the results of experiments carried out in the following Examples.

FIG. 2a is a graph showing conversion versus WHSV using Pt catalysts (10 wt % glycerol aqueous solution as reactant at 538° K (265° C.) and 900 psig); the filled and empty symbols stand for two repeat runs using 3 wt % Pt/γ-$Al_2O_3$ catalysts; symbols ◇ and ◆ show the results for 150-250 μm particles; symbols ○ and ● show the results for 250-300 μm particles; symbols Δ and ▲ show the results for 590-850 μm particles; symbol + shows the results for 3 wt % Pt/γ-$Al_2O_3$ catalyst (300-850 μm) tested in fixed bed tubular reactor (FBTR); and symbol − shows the results for 1 wt % Pt/γ-$Al_2O_3$ catalyst (300-850 μm) tested in the FBTR.

Figure 2B:
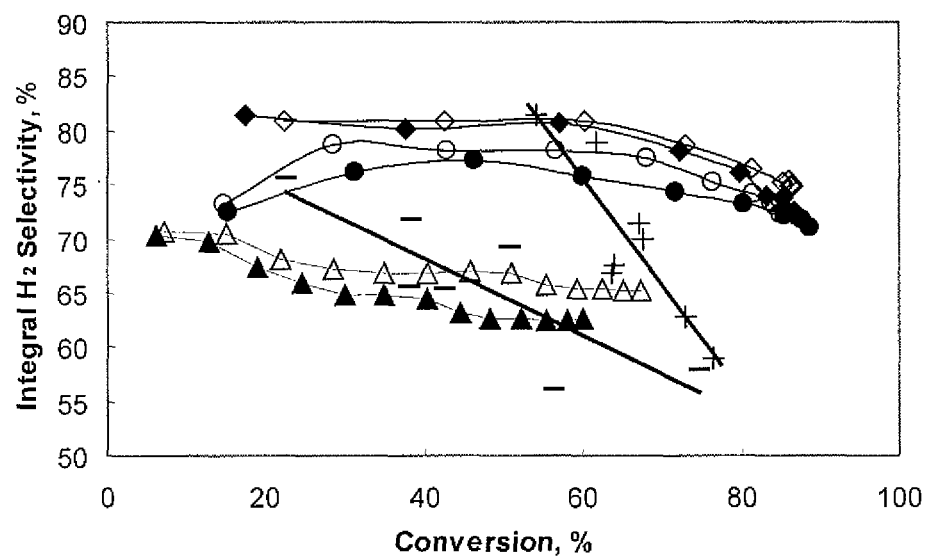

FIG. 2b is a graph showing integral hydrogen selectivity versus glycerol conversion using Pt catalysts (the symbols and conditions being the same as in FIG. 2a).

Figure 2C:
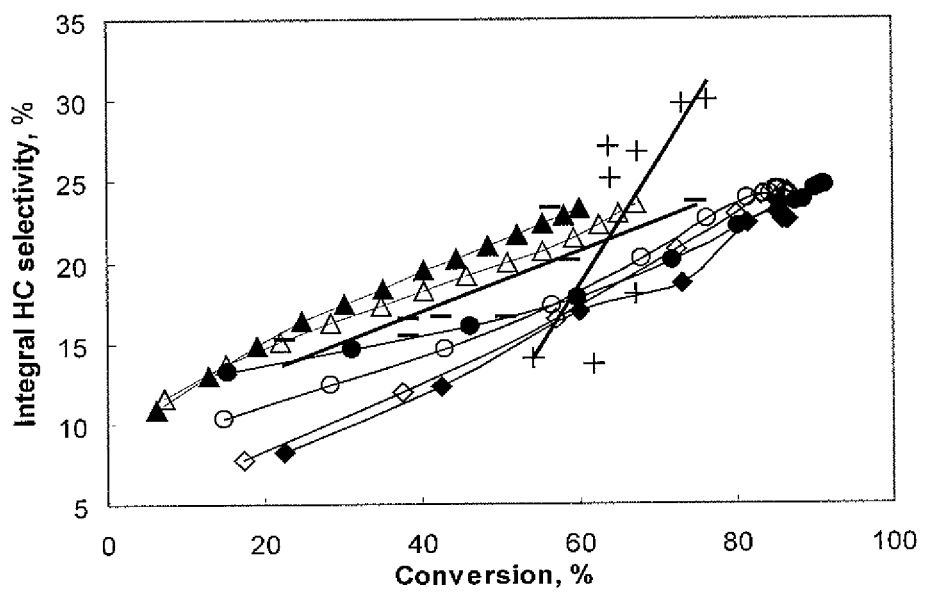

FIG. 2c is a graph showing alkane selectivity versus glycerol conversion using Pt catalysts (10 wt % glycerol aqueous solution as reactant, 538K (265° C.), 900 psig). The filled and empty symbols stand for two repeat runs using 3 wt % Pt/γ-$Al_2O_3$ catalysts. Symbols ◇ and ◆ show the results for 150-250 μm particles; symbols ○ and ● show the results for 250-300 μm particles; symbols Δ and ▲ show the results for 590-850 μm particles; symbol + shows the results for 3 wt % Pt/γ-$Al_2O_3$ catalyst (300-850 μm) tested in FBTR; and symbol − shows the results for 1 wt % Pt/γ-$Al_2O_3$ catalyst (300-850 μm) tested in the fixed bed tubular reactor.

Figure 2D:
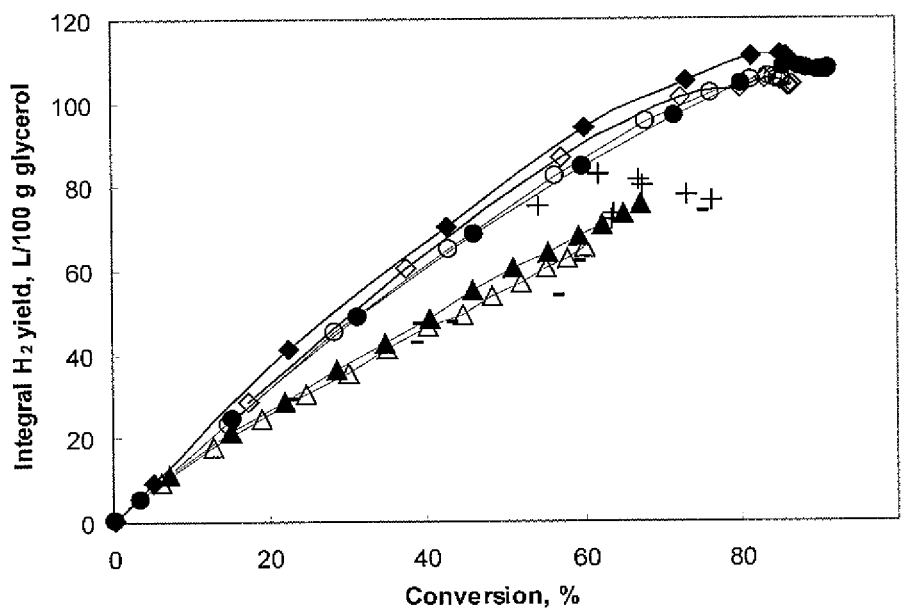

FIG. 2d is a graph showing the yield of hydrogen versus glycerol conversion using Pt catalysts (the symbols and conditions being the same as in FIG. 2c).

To demonstrate the effect of catalyst particle size on stirred tank reactor rate, the performance of catalysts supported on different sizes of γ-$Al_2O_3$ particles is also plotted in FIGS. 2a to 2d.

FIG. 2a shows that in the semi-batch stirred tank reactor glycerol conversion was strongly dependent on catalyst particle size. At the same WHSV (calculated with Equation 15), higher conversions, thus higher activity, were obtained for catalysts having smaller particle size. Moreover, the average conversions obtained for catalysts having 250-350 μm particle size are very close to those obtained for catalysts having 150-250 μm particle size and are higher than those obtained for larger catalyst having 590-850 μm particle size.

Furthermore, the inventors found that the catalyst was significantly more active in the stirred tank reactor than in the fixed bed tubular reactor. This is illustrated in FIG. 2a where the conversion level dropped much faster in the fixed bed tubular reactor than in the semi-batch stirred tank reactor. A fixed bed tubular reactor operating at the same high WHSV value as the semi-batch stirred tank reactor would convert very little glycerol and produce very little $H_2$.

Table 2 below summarizes the integral $H_2$ production rates for the semi-batch stirred tank reactor and the fixed bed tubular reactor using 3 wt % Pt catalysts. Table 2 shows that at the same conversion, the $H_2$ production rates for catalysts having the largest particle size (590-850 μm, Series III) obtained in the semi-batch stirred tank reactor were one order of magnitude higher than those for the fixed bed tubular reactor. For example, for 3 wt % Pt/γ-$Al_2O_3$ catalysts having 590-850 μm particle size (Series III) and glycerol conversion of 67%, the $H_2$ production rate was 180 L/100 g cat/h in the semi-batch stirred tank reactor while the $H_2$ production rate was 15 L/100 g cat/h in the fixed bed tubular reactor. At 54% conversion, the $H_2$ production rate was 208 L/100 g cat/h in the semi-batch stirred tank reactor while the $H_2$ production rate was 36 L/100 g cat/h in the fixed bed tubular reactor.

The WHSV parameter indicates that with the same weight of catalyst and the same contact time, stirred tank reactor can convert 10 times more glycerol than fixed bed tubular reactor with large catalyst particles (590-850 μm, Series III) and 18.5 times more glycerol with small catalyst particles (150-250 μm, Series I). As shown in Table 2, WHSV and $H_2$ production rates for catalysts having 150-250 μm particle size (Series I) for the stirred tank reactor were more than one order of magnitude higher than those for the fixed bed tubular reactor.

TABLE 2

Integral $H_2$ production rates obtained for fixed bed tubular reactor and semi-batch stirred tank reactor using 3 wt % Pt catalysts

| | WHSV, h$^{-1}$ | | | Integral $H_2$ production rate, L/100 g cat/h | | |
|---|---|---|---|---|---|---|
| Conversion, % | fixed bed tubular reactor | semi-batch stirred tank reactor (590-850 μm) | semi-batch stirred tank reactor (150-250 μm) | fixed bed tubular reactor | semi-batch stirred tank reactor (590-850 μm) | semi-batch stirred tank reactor (150-250 μm) |
| 67 | 0.27 | 2.8 | 5 | 15 | 180 | 287 |
| 54 | 0.5 | 4 | 7 | 36 | 208 | 296 |

FIGS. 2b and 2c show that $H_2$ and alkane selectivities changed with glycerol conversion and were strongly dependent on catalyst particle size. Hydrogen selectivity increased with the decrease in catalyst particle size, while alkane selectivity decreased. For example, at 60% glycerol conversion, $H_2$ selectivity for the semi-batch stirred tank reactor was 80%, 75% and 65% using catalysts having 150-250 μm (Series I), 250-300 μm (Series II) and 590-850 μm (Series III) particle size respectively, and alkane selectivity was 15%, 15% and 20% respectively.

The $H_2$ and alkane selectivities were less dependent on glycerol conversion with the semi-batch stirred tank reactor compared with fixed bed tubular reactor. In other words, $H_2$ and alkane selectivities obtained using the semi-batch stirred tank reactor did not change significantly with conversion compared with the fixed bed tubular reactor. Moreover, at high conversions, $H_2$ selectivity was higher for the semi-batch stirred tank reactor and alkane selectivity was lower. For example, at 80% conversion, $H_2$ selectivity was 55% for the fixed bed tubular reactor while for the semi-batch stirred tank reactor, it reached 76% with the smallest particle size (150-250 μm). At 80% conversion, the alkane selectivity was significantly lower for the semi-batch stirred tank reactor compared with fixed bed tubular reactor: 23% vs 33%.

Figure 3A:
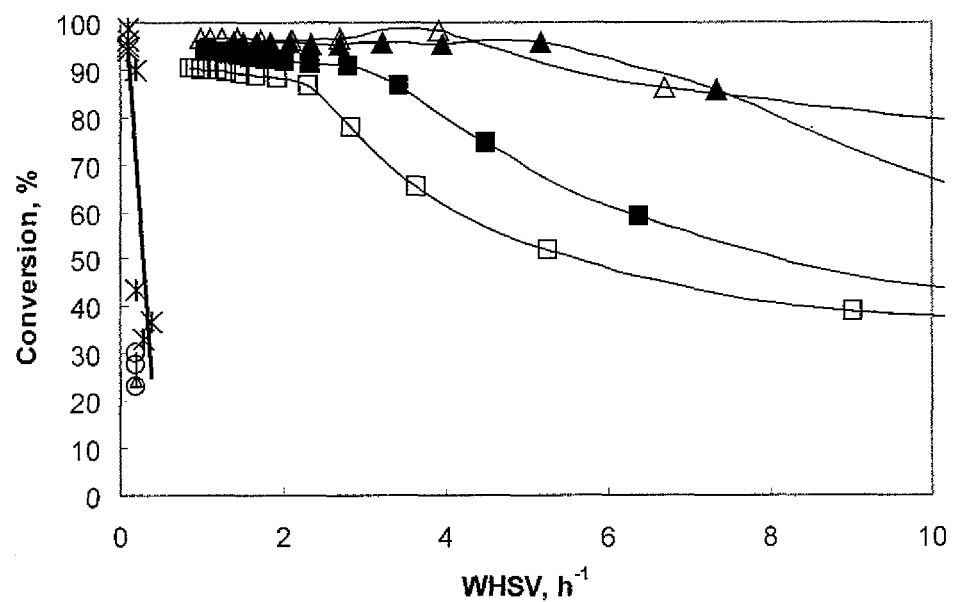
Figure 3B:
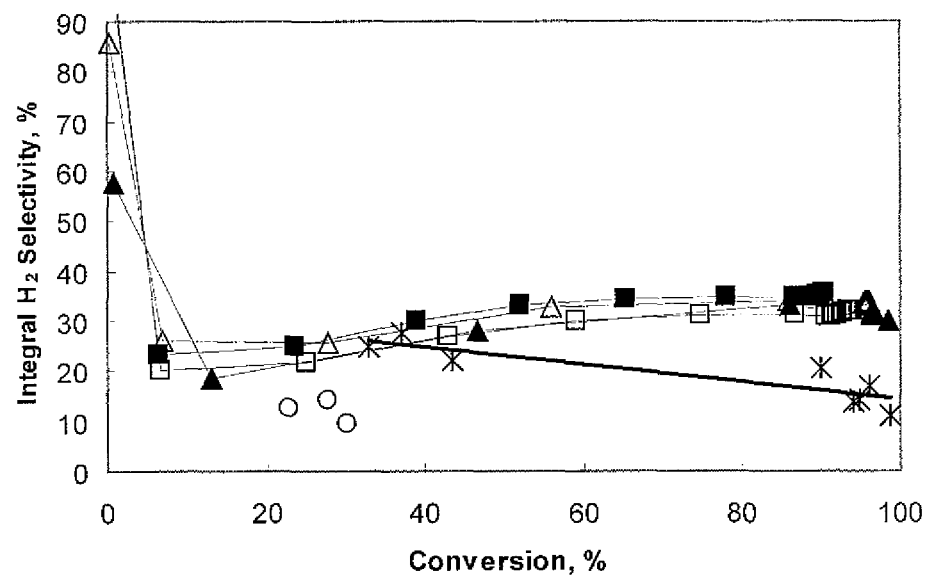
Figure 3C:
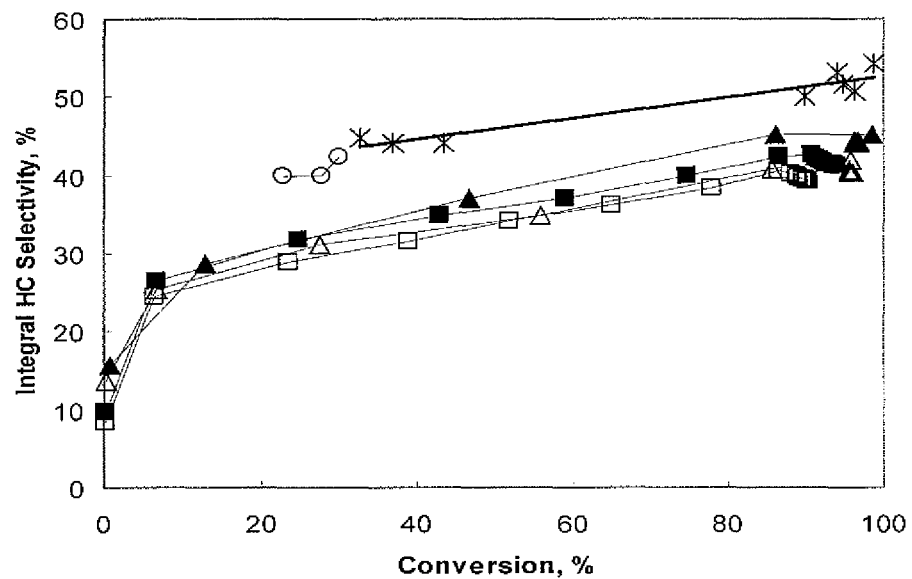
Figure 3D:
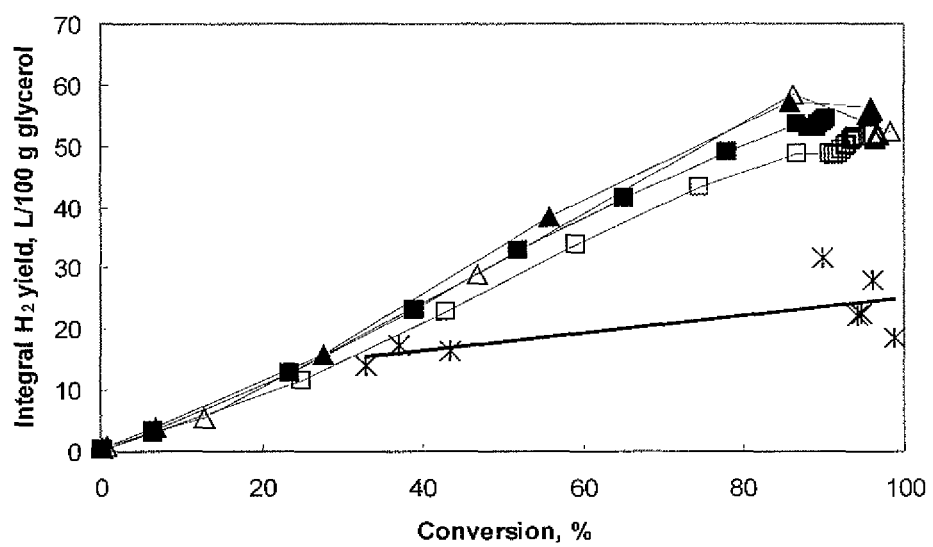

FIG. 3d shows $H_2$ yield as a function of glycerol conversion. At low conversions (<60%), $H_2$ yields were similar for both fixed bed tubular reactor and semi-hatch stirred tank reactor, while at high conversions, $H_2$ yield for the semi-batch stirred tank reactor was higher than that for the fixed bed tubular reactor. For example, at 60% conversion, $H_2$ yield was 90 L/100 g glycerol for the semi-batch stirred tank reactor, about 10% higher than the fixed bed tubular reactor (82 L/100 g glycerol). At 80% conversion, $H_2$ yield was 105 L/100 g glycerol for the stirred tank reactor, i.e., at least 40% higher than for fixed bed tubular reactor (75 L/100 g glycerol). The increased $H_2$ yield at the same conversion was due to increased $H_2$ selectivity using the stirred tank reactor. As discussed later, catalyst wetting is better in the stirred tank reactor and less $H_2$, CO and $CO_2$ re-adsorb on the catalyst for methanation reaction. FIG. 2d also shows that, at the same conversion, $H_2$ yield was higher on the small size catalyst than that obtained for the large size catalyst because the $H_2$ selectivity on the small particle catalyst was higher than that obtained on the large size catalyst particle. This is due to better mass transfer in the semi-batch stirred tank reactor.

Example 2

Performance of Nickel Catalysts

Catalysts 20 wt % and 40 wt % Ni/γ-$Al_2O_3$ were also tested using the semi-batch stirred tank reactor. Based on results obtained for 3 wt % Pt catalysts indicating that the performances of catalysts having small particle size were better, γ-$Al_2O_3$ support between 150-250 μm size were used to prepare 20 wt % and 40 wt % Ni/γ-$Al_2O_3$ catalysts. Experimental results are plotted in FIGS. 3a to 3d which are described as follows.

FIG. 3a is a graph showing conversion versus WHSV using Ni catalysts (10 wt % glycerol aqueous solution as reactant at 548° K (275° C.) and 900 psig). The filled and empty symbols stand for two repeat runs. Symbols Δ and ▲ show results for 40 wt % Ni catalysts (150-250 μm); symbols □ and ■ show the results for 20 wt % Ni catalyst (150-250 μm); symbol ○ shows the results for 20 wt % Ni/γ-$Al_2O_3$ catalyst (300-850 μm) tested in fixed bed tubular reactor (FBTR); and symbol * shows the results for 40 wt % Ni/γ-$Al_2O_3$ catalyst (300-850 μm) tested in FBTR;

FIG. 3b is a graph showing integral hydrogen selectivity versus conversion of glycerol using Ni catalysts (the symbols and conditions are the same as for FIG. 3a).

FIG. 3c is a graph showing integral alkane selectivity versus glycerol conversion using Ni catalysts (10 wt % glycerol aqueous solution as reactant at 548° K (275° C.) and 900 psig). Filled and empty symbols stand for two repeat runs. The symbols Δ and ▲ show results for 40 wt % Ni catalysts (150-250 μm); symbols □ and ■ show the results for 20 wt % Ni catalyst (150-250 μm); symbol ○ shows the results for 20 wt % Ni/γ-$Al_2O_3$ catalyst (300-850 μm) tested in FBTR; and symbol * shows the results for 40 wt % Ni/γ-$Al_2O_3$ catalyst (300-850 μm) tested in FBTR.

FIG. 3d is a graph showing integral hydrogen yield versus the conversion of glycerol to gas using Ni catalysts (the symbols and conditions are the same as in FIG. 3c).

Like 3 wt % Pt catalysts, the inventors found that Ni catalysts were significantly more active for the semi-batch stirred tank reactor than for the fixed bed tubular reactor. This is illustrated in FIG. 3a where the conversion level dropped much faster for fixed bed tubular reactor than for semi-batch stirred tank reactor and a fixed bed tubular reactor operating at the same high WHSV value as the semi-batch stirred tank reactor would convert very little glycerol and produce very little $H_2$.

Table 3 below summarizes the integral $H_2$ production rates obtained for the semi-batch stirred tank reactor and the fixed bed tubular reactor using 40 wt % Ni catalysts. Table 3 shows that at the same conversion, $H_2$ production rates for small particle size catalysts (125-250 μm, Series I) obtained for the semi-batch stirred tank reactor were more than one order of magnitude higher than those for the fixed bed tubular reactor. For example, using 40 wt % Ni/γ-$Al_2O_3$ catalyst having 150-250 um particle size (Series I) and at a glycerol conversion of 96%, $H_2$ production rate was 60 L/100 g cat/h for the semi-batch stirred tank reactor while $H_2$ production rate was 2.6 L/100 g cat/h for the fixed bed tubular reactor. At 43.4% conversion, $H_2$ production rate was 165 L/100 g cat/h for the semi-batch stirred tank reactor while $H_2$ production rate was 6.5 L/100 g cat/h for the fixed bed tubular reactor. The WHSV parameter indicates that for the same weight of catalyst and the same contact time, semi-batch stirred tank reactor can convert at least 20 times more glycerol than fixed bed tubular reactor using small catalyst particles (150-250 μm, Series I).

TABLE 3

Integral $H_2$ production rates fixed bed tubular reactor and semi-batch stirred tank reactor using 40 wt % Ni catalysts

| | WHSV, $h^{-1}$ | | Integral $H_2$ production rate, L/100 g cat/h | |
|---|---|---|---|---|
| Conversion, % | Fixed bed tubular reactor | semi-batch stirred tank reactor (150-250 μm) | fixed bed tubular reactor | semi-batch stirred tank reactor (150-250 μm) |
| 96 | 0.10 | 2.0 | 2.6 | 60 |
| 43.4 | 0.19 | 13 | 6.5 | 165 |

FIGS. 3b and 3c show selectivities of $H_2$ and of alkanes as a function of glycerol conversion. FIG. 3b shows that $H_2$ selectivity was higher than that obtained for the fixed bed tubular reactor at high conversions, and that alkane selectivity was lower. For example, at 80% conversion, $H_2$ selectivity was 35% for the semi-batch stirred tank reactor and only 18% for fixed bed tubular reactor while the alkane selectivity was at 40% for the semi-batch stirred tank reactor while it reached 50% for fixed bed tubular reactor (40 wt % Ni catalysts).

FIG. 3d shows $H_2$ yield as a function of glycerol conversion. FIG. 3d shows that, like 3 wt % Pt catalysts, $H_2$ yields were similar for both fixed bed tubular reactor and semi-batch stirred tank reactor at low conversion. At 40% conversion, $H_2$ yield was 25 L/100 g glycerol for the semi-batch stirred tank reactor while for the fixed bed tubular reactor the $H_2$ yield was 18 L/100 g glycerol. At high conversion, $H_2$ yield for the semi-batch stirred tank reactor was higher than that for the fixed bed tubular reactor. At 60% conversion, $H_2$ yield was 40 L/100 g glycerol for the semi-batch stirred tank reactor while for the fixed bed tubular reactor $H_2$ yield was 20 L/100 g glycerol. At 80% conversion, the difference was more significant: 50 L/100 g glycerol vs 23 L/100 g glycerol. The increased $H_2$ yield at high conversions was due to an increase in $H_2$ selectivity for the semi-batch stirred tank reactor: better mass transfer and lower probability of side reaction.

FIG. 2a and FIG. 3a show that, for both Ni and Pt catalysts (150-250 µm), $H_2$ production rates for the semi-batch stirred tank reactor were more than one order of magnitude higher than those for the fixed bed tubular reactor. FIG. 2a also shows that, even for the Pt catalyst having large particle size 590-850 µm, $H_2$ production rates from the semi-batch stirred tank reactor were one order of magnitude higher than those for the fixed bed tubular reactor.

However, FIGS. 2a and 3a show that, at high conversion, $H_2$ selectivities obtained for both Ni and Pt catalyst from the semi-batch stirred tank reactor were higher than those obtained for the fixed bed tubular reactor without modifying the catalyst active site. Hence the results show that the reactor configuration can affect $H_2$ selectivity.

Table 4 below compares the maximum yields over 3 wt % Pt/γ-$Al_2O_3$ for both reactors. A maximum $H_2$ yield of 108 L/100 g glycerol was obtained in the semi-batch stirred tank reactor at 91.0% glycerol conversion. This is 32.0% higher than the maximum $H_2$ yield obtained in a fixed bed tubular reactor using the same catalyst (81.6 L/100 g glycerol). The higher maximum $H_2$ yield achieved in the semi-batch stirred tank reactor was due to higher glycerol conversion, higher $H_2$ selectivity and lower alkane selectivity. At 91.5% glycerol conversion, $H_2$ selectivity in the semi-batch stirred tank reactor hardly decreased. It was still very close to 69.7% obtained in the fixed bed tubular reactor at 68.8% conversion. At the same operating conditions for maximum yield in the semi-batch stirred tank reactor, the $H_2$ production rate was 162 L/100 g cat/h. This rate is 9.6 times higher than 15.3 L/100 g cat/h in the fixed bed tubular reactor.

TABLE 4

Comparison of 3 wt % Pt/γ-$Al_2O_3$ performances in the semi-batch stirred tank reactor and the fixed bed tubular reactor

|  | fixed bed tubular reactor | semi-batch stirred tank reactor |
|---|---|---|
| WHSV, $h^{-1}$ (based on $C_3H_8O_3$) | 0.2 | 1.8 |
| $H_2$ yield, L/100 g $C_3H_8O_3$ | 81.6 | 107.7 |
| $H_2$ production rate, L/100 g cat/h | 15.3 | 162.0 |
| Glycerol conversion, % (to gaseous products) | 68.8 | 91.5 |
| $H_2$ selectivity, % | 69.7 | 69.0 |
| Alkane selectivity, % | 18.4 | 24.7 |

REFERENCES

1. Davda, R. R., Shabaker, J. W., Huber, G. W., Cortright, R. D. and Dumesic, J. A. "A review of catalytic issues and process conditions for renewable hydrogen and alkanes by aqueous-phase reforming of oxygenated hydrocarbons over supported metal catalysts" *Applied Catalysis B: Environmental* 56:1-2:171:186, 2005.
2. Huber, G. W., and Dumesic, J. A. "An overview of aqueous-phase catalytic processes for production of hydrogen and alkanes in a biorefinery" *Catalysis Today* 111:1-2:119:132, 2006.
3. Cortright, R. D., Davda, R. R. and Dumesic, J. A. "Hydrogen from catalytic reforming of biomass-derived hydrocarbons in liquid water" *Nature* 418:6901: 964:967, 2002.
4. Davda, R. R., and Dumesic, J. A. "Catalytic reforming of oxygenated hydrocarbons for hydrogen with low levels of carbon monoxide" *Angewandte Chemie—International Edition* 42:34:4068:4071, 2003.
5. Huber, G. W., Shabaker, J. W., Evans, S. T. and Dumesic, J. A. "Aqueous-phase reforming of ethylene glycol over supported Pt and Pd bimetallic catalysts" *Applied Catalysis B: Environmental* 62:3-4:226:235, 2006.
6. Shabaker, J. W., Davda, R. R., Huber, G. W., Cortright, R. D. and Dumesic J. A. "Aqueous-phase reforming of methanol and ethylene glycol over alumina-supported platinum catalysts" *Journal of Catalysis* 215:2:344:352, 2003.
7. Shabaker, J. W., and Dumesic, J. A. "Kinetics of aqueous-phase reforming of oxygenated hydrocarbons: Pt/$Al_2O_3$ and Sn-modified Ni catalysts" *Industrial and Engineering Chemistry Research* 43:12:3105-3112, 2004.
8. Shabaker, J. W., Huber, G. W., Davda, R. R., Cortright, R. D. and Dumesic, J. A. "Aqueous-phase reforming of ethylene glycol over supported platinum catalysts" *Catalysis Letters* 88:1-2:1:8, 2003.
9. Shabaker, J. W., Huber, G. W. and Dumesic, J. A. "Aqueous-phase reforming of oxygenated hydrocarbons over Sn-modified Ni catalysts" *Journal of Catalysis* 222:1:180:191, 2004.
10. Shabaker, J. W., Simonetti, D. A., Cortright, R. D. and Dumesic, J. A. "Sn-modified Ni catalysts for aqueous-phase reforming: characterization and deactivation studies" *Journal of Catalysis* 231:1:67:76, 2005.
11. Monnier, J., Tourigny, G., Sulimma, H. and Pelletier, L. "Low temperature production of hydrogen from glycerol and sugars" 18*th Canadian Symposium on Catalysis*, Montreal, Quebec, Canada, May 16-19, 2004,
12. Monnier, J., Tourigny, G., Sulimma, H. and Pelletier, L. "Evaluation of catalyst performance for low temperature production of hydrogen from glycerol and sugars" 19*th North American Catalysis Society Meeting*, Philadelphia, Pa. USA, May 22-27, 2005.
13. Guo, J. and Al-Dajjan, M. "Activity and stability of iron-containing pillared clay catalysts for wet air oxidation of phenol" *Applied Catalysis A: General* 299:175:184, 2006.
14. Perry R. and Green, D. "Perry's chemical engineer's Handbook" *McGraw-Hill Education*, 1998.
15. Pitault, I., Fongarland, P., Mitrovic, M., Ronze, D. and Forissier, M. "Choice of laboratory scale reactors for HDT kinetic studies or catalyst tests" *Catalysis Today* 98:31:42, 2004.
16. Cao, C. and Fung, S. "Comparison of heterogeneous catalyst activities in various reactor types and reaction conditions" *Chemical Engineering Technology* 29:3:307:312, 2006.

What is claimed is:

1. A process of producing hydrogen in which water is reacted with an oxygenated hydrocarbon in the liquid phase in the presence of a metal catalyst supported on a solid carrier material dispersed in said liquid phase, characterized in that the reaction is carried out in a continuous stirred tank reactor in the absence of an electrolyte at a temperature in a range of 255 to 300° C. and at a pressure sufficiently high to maintain said water and said oxygenated hydrocarbon in the liquid phase at said temperature.

2. A process according to claim 1, wherein said pressure is in a range of 350 to 1350 psig.

3. A process according to claim 1, wherein said temperature is in a range of 255 to 285° C. and said pressure is 900±175 psig.

4. A process according to claim 1, wherein the oxygenated hydrocarbon is derived from biomass.

5. A process according to claim 1, wherein the oxygenated hydrocarbon is a compound selected from the group consisting of glycerol, methanol, ethylene glycol, xylose, sorbitol and sugars.

6. A process according to claim 5, wherein the oxygenated hydrocarbon is glycerol obtained as a byproduct of transesterification of triglycerides.

7. A process according to claim 5, wherein the oxygenated hydrocarbon is selected from $C_5$ and $C_6$ sugars derived from cellulose or hemicellulose.

8. A process according to claim 1, wherein said supported metal is a metal selected from the group consisting of platinum, nickel, palladium, ruthenium, rhodium, iridium and tin-promoted nickel.

9. A process according to claim 1, wherein said solid carrier material is a material selected from the group consisting of alumina, silica-alumina, silica, titania, carbon and zeolite.

10. A process according to claim 1, wherein said solid carrier material is a material in the form of solid particles having a size of 850 microns or less.

11. A process according to claim 10, wherein the particles have a size range of 150 to 250 microns.

12. A process according to claim 10, wherein the particles have a size range of 250 to 300 microns.

13. A process according to claim 10, wherein the particles have a size range of 590 to 850 microns.

14. A process according to claim 1, wherein said oxygenated hydrocarbon and water are reacted at a weight hourly space velocity in a range of 1.0 to 10.0 $h^{-1}$.

15. A process according to claim 1, wherein hydrogen is separated from a gaseous reaction mixture produced by the process.

* * * * *